United States Patent
Levin et al.

(10) Patent No.: US 11,102,220 B2
(45) Date of Patent: Aug. 24, 2021

(54) DETECTION OF BOTNETS IN CONTAINERIZED ENVIRONMENTS

(71) Applicant: Twistlock, Ltd., Herzliya (IL)

(72) Inventors: Liron Levin, Herzliya (IL); Dima Stopel, Herzliya (IL); John Morello, Baton Rouge, LA (US)

(73) Assignee: Twistlock, Ltd., Herzliya (IL)

( * ) Notice: Subject to any disclaimer, the term of this patent is extended or adjusted under 35 U.S.C. 154(b) by 262 days.

(21) Appl. No.: 16/214,749

(22) Filed: Dec. 10, 2018

(65) Prior Publication Data

US 2019/0190931 A1 Jun. 20, 2019

Related U.S. Application Data

(60) Provisional application No. 62/607,611, filed on Dec. 19, 2017.

(51) Int. Cl.
| | |
|---|---|
| *H04L 29/06* | (2006.01) |
| *G06F 21/54* | (2013.01) |
| *H04L 9/32* | (2006.01) |
| *H04L 29/12* | (2006.01) |

(52) U.S. Cl.
CPC .......... *H04L 63/1416* (2013.01); *G06F 21/54* (2013.01); *H04L 9/3263* (2013.01); *H04L 63/101* (2013.01); *H04L 63/20* (2013.01); *H04L 61/1511* (2013.01); *H04L 63/123* (2013.01); *H04L 2463/144* (2013.01)

(58) Field of Classification Search
None
See application file for complete search history.

(56) References Cited

U.S. PATENT DOCUMENTS

| | | | | |
|---|---|---|---|---|
| 9,762,610 | B1* | 9/2017 | Kwan | H04L 63/20 |
| 9,832,217 | B2* | 11/2017 | Berger | G06F 21/552 |
| 9,917,852 | B1* | 3/2018 | Xu | H04L 63/0236 |
| 10,432,648 | B1* | 10/2019 | Xu | G06N 20/00 |
| 2016/0359887 | A1* | 12/2016 | Yadav | H04L 61/1511 |
| 2017/0195352 | A1* | 7/2017 | Yishay | H04L 63/145 |
| 2017/0201490 | A1* | 7/2017 | Kinder | H04L 63/0281 |
| 2017/0366562 | A1* | 12/2017 | Zhang | G06N 20/00 |
| 2018/0288062 | A1* | 10/2018 | Goyal | H04L 63/1408 |
| 2020/0236093 | A1* | 7/2020 | Bannister | G06F 21/50 |

* cited by examiner

*Primary Examiner* — Kambiz Zand
*Assistant Examiner* — Arezoo Sherkat
(74) *Attorney, Agent, or Firm* — M&B IP Analysts, LLC

(57) ABSTRACT

A method and system for runtime detection of botnets in containerized environments. The method includes creating a domain name system (DNS) policy for a software container, wherein the DNS policy defines at least a plurality of allowed domain names for the software container, wherein the DNS policy is created based on historical DNS queries by the software container; detecting a botnet based on traffic to and from the software container, wherein the botnet is detected when at least a portion of the traffic does not comply with the DNS policy, wherein the botnet is implemented via communication with a bot executed in the software container; and blocking at least one DNS query in the at least a portion of traffic, wherein each blocked DNS query is to a domain having a domain name that does not match any of the plurality of allowed domain names for the software container.

17 Claims, 4 Drawing Sheets

DETECTION OF BOTNETS IN CONTAINERIZED ENVIRONMENTS

CROSS-REFERENCE TO RELATED APPLICATIONS

This application claims the benefit of U.S. Provisional Application No. 62/607,611 filed on Dec. 19, 2017, the contents of which are hereby incorporated by reference.

TECHNICAL FIELD

The present disclosure generally relates to cybersecurity systems, and more particularly to cyber-security for containerized environments.

BACKGROUND

A software container is an instance of a user-space running an application within the operating system (OS) of a host device (e.g., a server). Software containers enable operating-system-level virtualization in which the OS kernel allows the existence of multiple isolated software containers.

A software container (or a container) provides an executable environment with a complete filesystem. The filesystem may contain code, runtime, system tools, system libraries, and so on. That is, execution of a software container can be the same regardless of the underlying infrastructure. Docker® is one popular existing platform for creating, migrating, managing, and deploying software containers.

A software container, unlike a virtual machine, does not require or include a separate operating system. Rather, the container relies on the kernel's functionality and uses hardware resources (CPU, memory, I/O, network, etc.) and separate namespaces to isolate the application's view of the operating system. A software container can access the OS kernel's virtualization features either directly or indirectly. For example, Linux kernel can be accessed directly using the libcontainer library or indirectly using the libvirt service.

As demonstrated in FIG. 1, a number of software containers (i.e., the app containers 110-1 through 110-$n$, hereinafter referred to individually as a container 110, merely for simplicity purposes) can access and share the same OS kernel 120. However, each container 110 can be constrained to only use a defined amount of hardware resources (e.g., CPU, memory, etc.) in the underlying hardware (HW) layer 130. Thus, using software containers, hardware resources can be isolated, services can be restricted, and processes can be provisioned to have an almost completely private view of the operating system with their own process ID space, file system structure, and network interfaces.

FIG. 2 illustrates a typical structure of a software container 200. The software container 200 includes a base image 210 and a container layer 220. The base image 210 includes one or more image layers 215-1 through 215-$q$ (hereinafter referred to individually as a layer 215 and collectively as layers 215, merely for simplicity purposes). The layers 215 are read-only layers that represent filesystem differences. That is, the layers 215 are stacked on top of each other to form a base for a root filesystem of the container 200. The layers 215 are read only, and each layer 215 is identified by a randomly generated identifier number of a checksum computed using a hash function. All layers 215 and the base image 210 are collectively referred to as a "container image."

The base image 210 (and its layers 215) can be shared across different software containers. Thus, only the container layer 220 differentiates between one software container and another. The container layer 220 is a readable and writable layer where all data written to the software container 200 is saved in the container layer 220. When the software container 200 is deleted, the writable container layer 220 is also deleted, and the base image 210 remains unchanged. As such, the software container 200 and other software containers (not shown) can share access to the same base image 210, where each software container has its own data state. In the example demonstrated in FIG. 2, the software container 200 is a Docker container (e.g., compliant with the Docker platform).

The popularity of software containers has been increased due to the easy integration with cloud-computing platforms (e.g., Amazon® Web Services, Google® Cloud Platform, Microsoft® Azure, etc.). On such platforms, service providers can offer operating systems to run services and applications. With that said, the increasing reliance on software containers increases the need for secured execution.

Container images are typically uploaded and stored in image registries that may or may not be managed by an organization. Further, the base images are used across many container images. As such, base images can be developed and uploaded to image registries by programmers who are associated with the organization seeking to use the image. Therefore, hackers can take advantage of program images by including malicious code carrying malware into images and proceeding to upload the malware-containing images.

The propagation and control over malware can be achieved by means of a malware bot (also known as a bot). A bot is a computer infected with malware having the ability to communicate with an attacker through a Command and Control (CnC) server. A botnet is a large collection of computers that are infected with a specific malware and can communicate with the same CnC server or group of servers. An owner of a computer may not be aware that the computer is a bot or part of a botnet.

Existing security solutions are inefficient in detecting botnets and, in particular, bots executed from software containers. Some existing security solutions attempt to scan computers for the existence of malware or to detect communications with a CnC server. The malware scan is limited to analyzing binary executable files to determine if a malware signature is contained therein. Such a scan is limited to known malware signatures. However, there is a virtually infinite number of ways that a binary botnet file can be implemented such that a malware scan may result in false negatives. Furthermore, software containers implementing scanning solutions would be limited to detecting static scanning for malware signatures when the containers are saved in image registries.

Solutions for detecting messages directed to CnC servers are inefficient because such messages are usually encoded. In addition, the location (i.e., as indicated by an IP address or a domain name) of a CnC server is usually hidden or unknown. Attackers typically hide CnC servers using techniques such as a fast domain generation algorithm (DGA). Such a technique periodically generates many domain names that can be used to access CnC servers.

Additionally, solutions for detecting communications with CnC servers are not proactive in that they address such communications with the CnC server after they have already begun. For example, such existing solutions do not detect when a botnet may have been activated but has not yet begun communicating.

It would therefore be advantageous to provide a solution for detecting bots and botnets operable in containerized environments.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for runtime detection of botnets in containerized environments. The method comprises creating a domain name system (DNS) policy for a software container, wherein the DNS policy defines at least a plurality of allowed domain names that are allowed to be accessed by the software container, wherein the DNS policy is created based on historical DNS queries by the software container; detecting a botnet based on traffic to and from the software container, wherein the botnet is detected when at least a portion of the traffic does not comply with the DNS policy, wherein the botnet is implemented via communication with a bot executed in the software container; and blocking at least one DNS query in the at least a portion of traffic, wherein each blocked DNS query is to a domain having a domain name that does not match any of the plurality of allowed domain names for the software container.

Certain embodiments disclosed herein also include a non-transitory computer readable medium having stored thereon causing a processing circuitry to execute a process, the process comprising: creating a domain name system (DNS) policy for a software container, wherein the DNS policy defines at least a plurality of allowed domain names that are allowed to be accessed by the software container, wherein the DNS policy is created based on historical DNS queries by the software container; detecting a botnet based on traffic to and from the software container, wherein the botnet is detected when at least a portion of the traffic does not comply with the DNS policy, wherein the botnet is implemented via communication with a bot executed in the software container; and blocking at least one DNS query in the at least a portion of traffic, wherein each blocked DNS query is to a domain having a domain name that does not match any of the plurality of allowed domain names for the software container.

Certain embodiments disclosed herein also include a system for runtime detection of botnets in containerized environments. The system comprises: a processing circuitry; and a memory, the memory containing instructions that, when executed by the processing circuitry, configure the system to: create a domain name system (DNS) policy for a software container, wherein the DNS policy defines at least a plurality of allowed domain names that are allowed to be accessed by the software container, wherein the DNS policy is created based on historical DNS queries by the software container; detect a botnet based on traffic to and from the software container, wherein the botnet is detected when at least a portion of the traffic does not comply with the DNS policy, wherein the botnet is implemented via communication with a bot executed in the software container; and block at least one DNS query in the at least a portion of traffic, wherein each blocked DNS query is to a domain having a domain name that does not match any of the plurality of allowed domain names for the software container.

BRIEF DESCRIPTION OF THE DRAWINGS

The subject matter disclosed herein is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
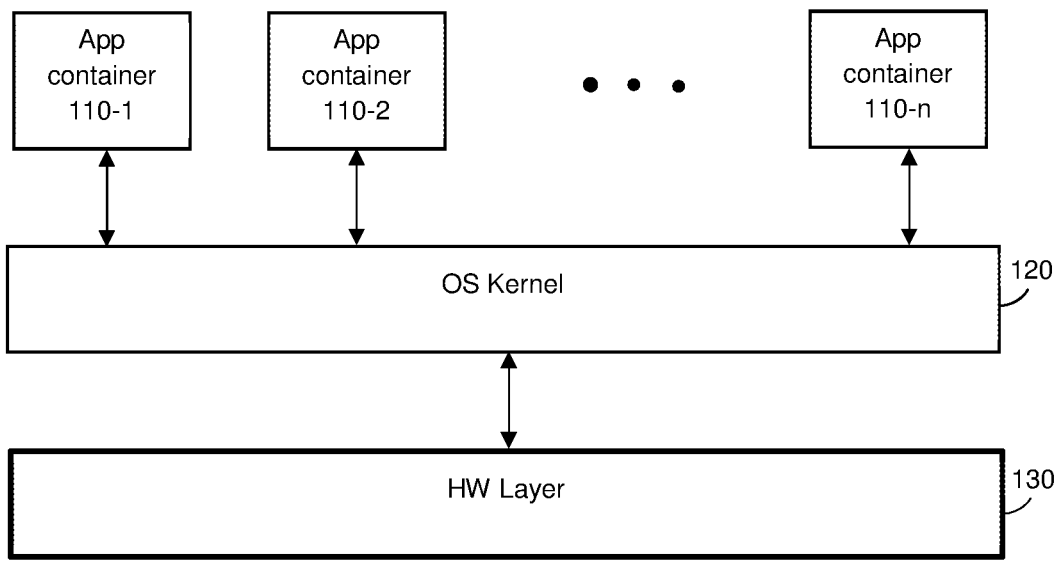
FIG. 1 is a diagram illustrating execution of a plurality of software containers.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The disclosed embodiments provide techniques for detecting botnets in containerized environments. During a learning phase, a domain name system (DNS) policy is created for a software container. The DNS policy defines a whitelist of allowed domain names for the software container. During a detection phase, a botnet may be detected based on the DNS policy and traffic to and from the software container. The detected botnet is implemented using a bot executed in the software container to communicate with other bots in the botnet. The botnet is mitigated by at least blocking DNS queries to domain names that are not whitelisted, thereby preventing communications between, for example, a botnet master and one of the bots in the botnet.

The disclosed embodiments provide techniques for cyber security in containerized environments that do not require predetermined signatures of known malware. Accordingly, the disclosed embodiments allow for efficient adaption to newly emerging botnet-based threats. To this end, it has been identified that containers typically communicate with other services in the same cluster or otherwise communicate with a limited set of known addresses in other domains. Thus, it has been determined that communications with unusual entities (e.g., an unknown server) are often symptoms of a bot in a software container communicating with other bots in a botnet. To this end, the disclosed embodiments include learning whitelists of known domain names for each software container and detecting malicious traffic by comparing the learned whitelists to domain names indicated in DNS queries in subsequent traffic to and from the software containers.

Figure 3:
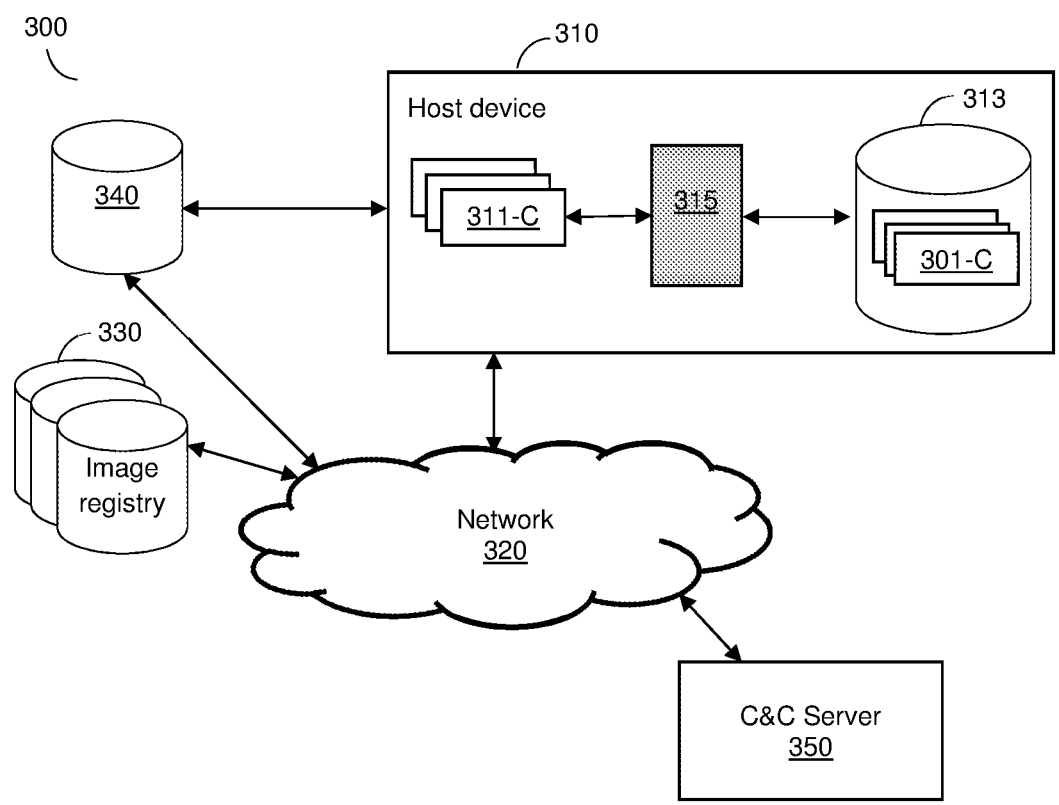
FIG. 3 is a network diagram utilized to describe the various disclosed embodiments.

FIG. 3 is an example network diagram 300 utilized to describe the various disclosed embodiments. A host device 310 is communicatively connected to a network 320. The host device 310 can be realized as a physical machine, a virtual machine, or a cloud infrastructure (IaaS). Examples for such a cloud infrastructure include, but are not limited to, Amazon Web Services (AWS), Cisco® Metapod, Microsoft Azure®, Google® Compute Engine (GCE), Joyent®, and the like. The host device 310 may be deployed in a datacenter, a cloud computing platform (e.g., a public cloud, a private cloud, or a hybrid cloud), on-premises of an organization, or in a combination thereof. The network 320 may be the Internet, the world-wide-web (WWW), a local area network (LAN), a wide area network (WAN), a metro area network (MAN), and other networks.

Figure 2:
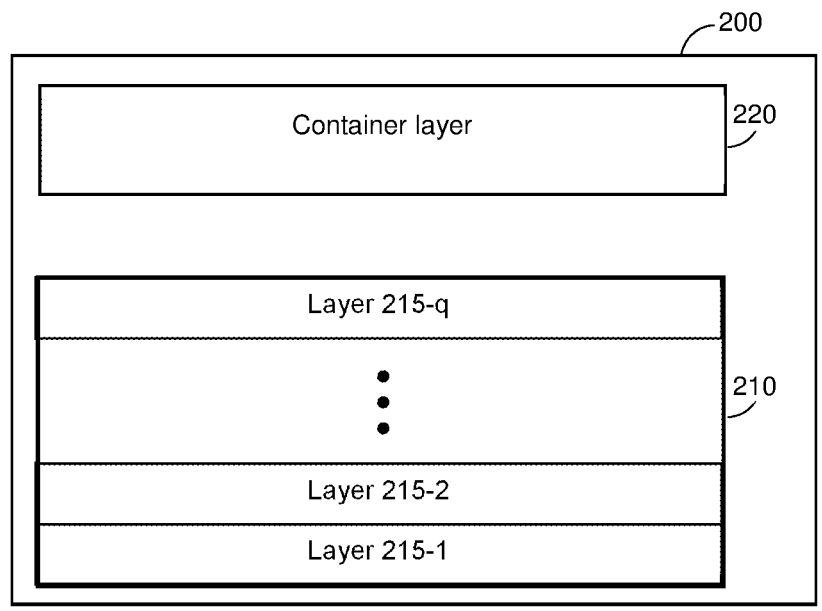
FIG. 2 is a diagram illustrating a structure of a software container.

Also connected to the network 320 is one or more image registries 330 (collectively referred to hereinafter as image registries 330 and individually as an image registry 330, merely for simplicity purposes). Each image registry 330 stores container images 301 that can be imported and executed on the host device 310. An example container image is shown in FIG. 2. A container image 301 is a static file, and a runtime instance of the container image 301 is a software container 311 executing a specific application (hereinafter "APP container" 311).

An image registry 330 may be, but is not limited to, Docker Hub, Google Container Registry, Amazon EC2 Container Registry, Artifactory, and the like. The image registry 330 is a data repository that allows for programming and testing of container images. An image registry 330 typically provides a centralized resource for discovery, distribution, management, and collaboration of base images. An image registry 330 may be a cloud-based registry service or may be on-premises. In certain configurations, container images can be locally stored at the host device 310, e.g., in a registry 313.

In an example implementation, malicious traffic to or from malicious entities such as a command and control (C&C) server 350 is to be blocked. The command and control server 350 is configured to issue commands to bots and specifically, with respect to the example implementation described herein, to bots (or botnets) executed by one or more of the APP containers 311.

According to the disclosed embodiments, the host device 310 is configured to host and execute a detector container 315. The detector container 315 is a software container configured to monitor traffic to and from the APP containers 311 in accordance with the disclosed embodiments. For example, a registry 313 includes a container image 301-C, where the runtime instance of this image is an APP container 311-C. The detector container 315 may be configured to monitor at least traffic to and from the App container 311-C.

In an embodiment, the detector container 315 is configured to detect botnets implemented using bots (not shown) executed via APP containers 311 of the host device 310, and to block malicious traffic from the bot-containing APP containers 311. Accordingly, malicious traffic such as communications between bots and their control servers may be blocked or otherwise mitigated, thereby protecting the host device 310 from bot commands. To detect botnets, the detector container 315 is configured to create, for each APP container 311 at runtime, a DNS policy defining a whitelist of allowed domain names for each APP container 311.

Traffic is inspected, and traffic that does not meet the DNS policy is determined to be malicious traffic. When traffic is determined to be malicious, a botnet is detected. In some implementations, mitigation actions such as blocking malicious DNS queries may be performed.

The whitelist for each APP container 311 is created based on learning of domain names indicated in requests from the APP container 311. The whitelist may include specific domain names (e.g., fully-qualified domain names). When traffic is directed to a domain name not included in the whitelist, the traffic is determined to be malicious.

The previously resolved domain names that were resolved by previous DNS queries made by the APP container 311. Whether each domain name was resolved by previous DNS queries may be determined based on historical data of DNS query resolutions. DNS queries to domain names associated with domain names that were not resolved by previous DNS queries may be determined to be malicious such that botnets are detected and such DNS queries to unresolved domain names may be blocked. For example, if a request is issued to name "www.example.com" associated with IP address "1.1.1.1" but no DNS query ever resolved to "www.example.com", it may be determined that the domain name name is an unresolved domain name. Alternatively or collectively, the previously resolved domain names may include a list of domain names that is embedded in a configuration of the APP container 311, which may be retrieved and checked against domain names returned from DNS queries issued by the APP container 311.

The DNS policy may further define normal behavior for the APP container 311 such that botnets are detected when DNS queries are directed to domain names that were not previously resolved by the software container or that otherwise demonstrate abnormal behavior of the software container.

The normal behavior for each APP container 311 may be defined based on, but not limited to, a type of the APP container 311 or a type of application executed therein, learned normal DNS traffic behavior of the APP container 311, both, and the like. To this end, the normal behavior may be defined using rules related to, but not limited to, a number of DNS queries per time period, normal types of queries (e.g., non-DNS or DNS), usual or unusual destinations for DNS queries, formatting, types of queries, software in the APP container 311, known Internet Protocol (IP) addresses for the APP container 311 (i.e., IP addresses that were results of previously resolved DNS queries), signatures of known entities with which the APP container 311 has previously communicated (e.g., entities that own or operate systems with which the APP container 311 previously communicated as indicated by network signatures of the entities), and the like. When traffic does not match normal traffic behavior as defined by the rules, the traffic is determined to be malicious and any DNS queries included in the malicious traffic may be blocked.

As non-limiting examples, abnormal behavior may include multiple DNS queries directed to unusual domain names, many DNS queries in a period of time, DNS queries sent to a different DNS server than usual, DNS queries with incorrect formatting or unknown types, requests to entities that are not DNS servers, querying for multiple subdomains, DNS queries exhibiting features indicating that they were generated by pre-defined functions, domain names with high entropy and variance from other queries in a cluster, detection of DNS hijacking (e.g., based on comparison to previous DNS queries, DNS metadata, or query results matching a known blacklist of IP addresses), queries directed to entities outside of a cluster (entities that only communicate locally with other entities in the same cluster), failure to use results of DNS queries (i.e., requesting IP addresses but not utilizing the requested IP addresses), comparison to expected domains as indicated in code of the APP container 311, and the like.

In an embodiment, the DNS policy is created during a learning phase. The learning phase for each APP container 311 occurs during runtime of the APP container 311 and may include a period of time after initialization of the APP container 311. When the learning phase is complete, traffic from each APP container 311 may be inspected at runtime and checked against the DNS policy. Traffic that does not meet the DNS policy may be determined to be malicious traffic, and APP containers 311 sending requests included in the malicious traffic may be identified as bots.

In an embodiment, execution of an APP container 311 (e.g., the APP container 311-C) may be performed in a quarantined environment, thereby protecting the host device 310 from any malicious activity. Example techniques and configurations for execution of software containers in quarantined environments are described further in U.S. patent application Ser. No. 15/278,700, assigned to the common assignee, the contents of which are hereby incorporated by reference.

It should be noted that a single command and control server 350 is shown in FIG. 3 merely for simplicity purposes, and that requests to multiple command and control servers attempting to control bots executed in the host device 310 may be detected and blocked with respect to DNS-based traffic inspection in accordance with the disclosed embodiments. Further, traffic to other command and control systems configured for controlling bots may be equally blocked regardless of whether those systems would be typically classified as servers. As a non-limiting example, traffic including requests to other bots (e.g., bots in a random topology botnet) having domain names that are not recognized in the learned whitelist may be blocked.

Figure 4:
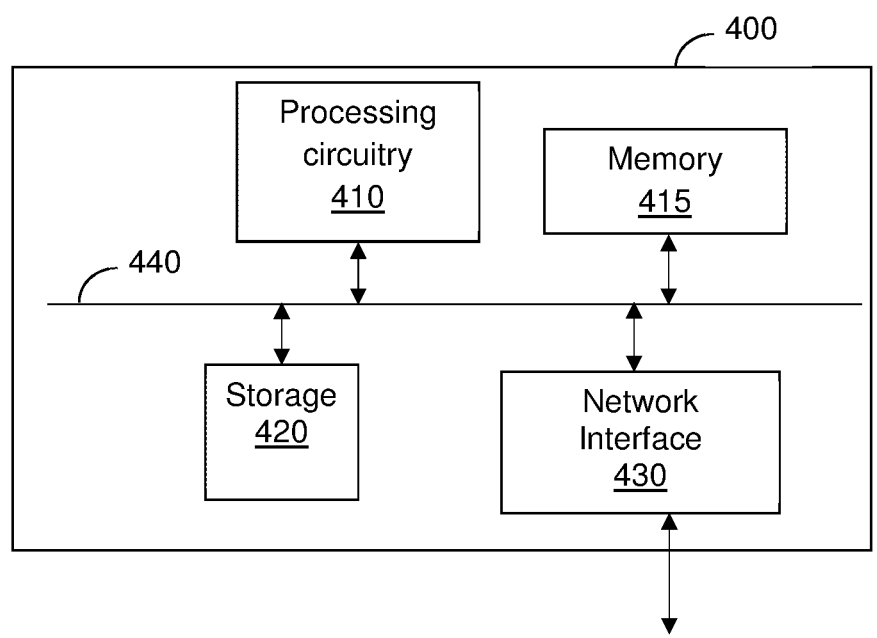
FIG. 4 is a block diagram of a hardware layer in a host device according to an embodiment.

It should be appreciated that the host device requires an underlying hardware layer to execute the OS, VMs, and software (APP) containers. An example block diagram of a hardware layer 400 is shown in FIG. 4. The hardware layer 400 includes a processing circuitry 410, a memory 415, a storage 420, and a network interface 430, all connected to a computer bus 440.

The processing circuitry 410 may be realized by one or more hardware logic components and circuits. For example, and without limitation, illustrative types of hardware logic components that can be used include Field Programmable Gate Arrays (FPGAs), Application-specific Integrated Circuits (ASICs), System-on-a-chip systems (SOCs), Complex Programmable Logic Devices (CPLDs), general-purpose microprocessors, microcontrollers, digital signal processors (DSPs), and the like, or any other hardware logic components that can perform calculations or other manipulations of information. The memory may be volatile, non-volatile, or a combination thereof. The storage may be magnetic storage, optical storage, and the like.

In one configuration, computer readable instructions to implement one or more embodiments disclosed herein may be stored in the storage. The storage may also store other computer readable instructions to implement an operating system, an application program, and the like. Computer readable instructions may be loaded in the memory for execution by the processing circuitry 410.

In another embodiment, the storage 420, the memory 415, or both, are configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various functions described herein.

The network interface 430 allows communication with other external systems or host devices through a network (e.g., the network 320). The network interface 430 may include a wired connection or a wireless connection. The network interface 430 may transmit communication media, receive communication media, or both. The computer bus 440 may be, for example, a PCIe bus.

Figure 5:
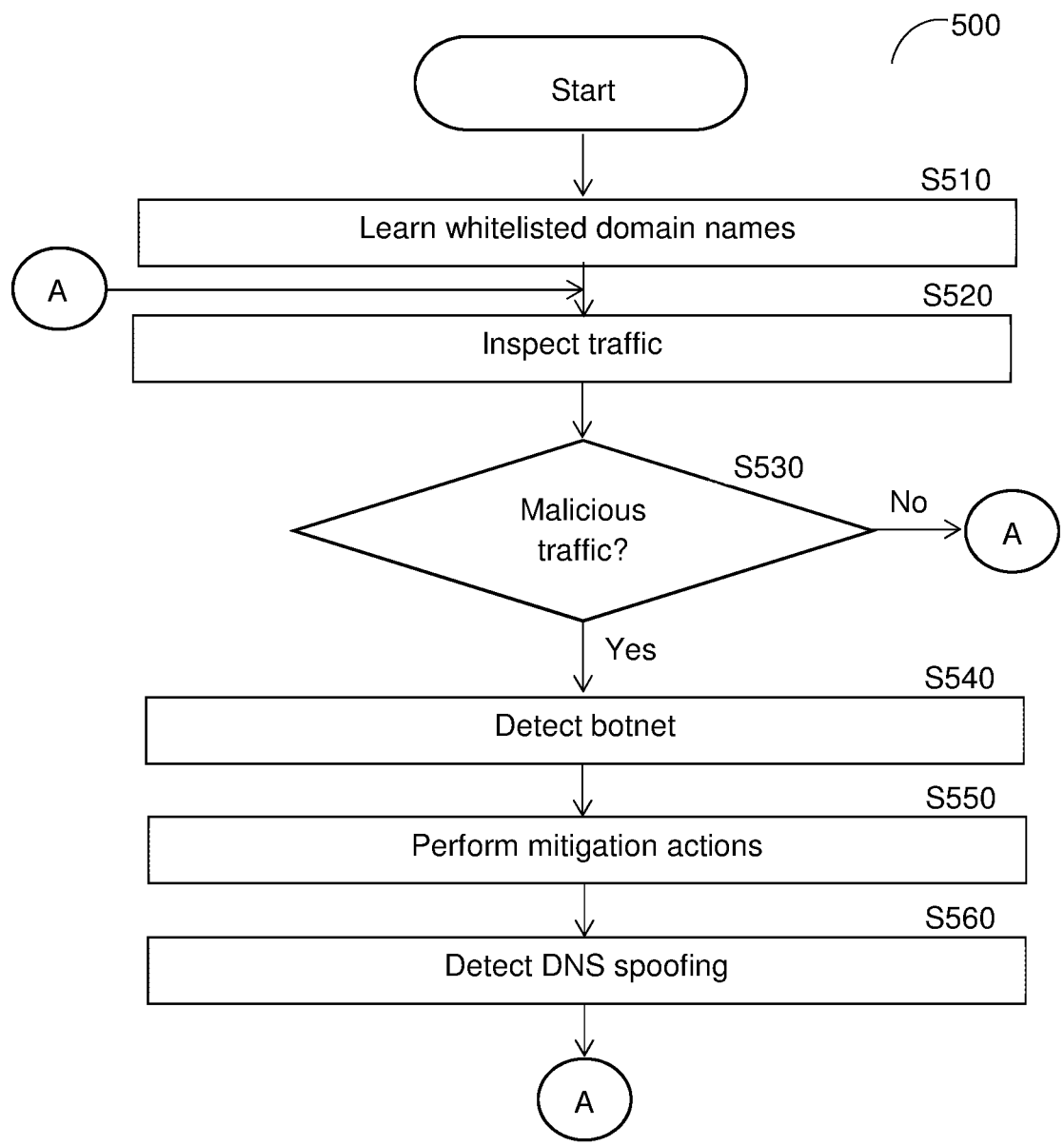
FIG. 5 is a flowchart illustrating a method for blocking malicious traffic in containerized environments based on learned domain names according to an embodiment.

FIG. 5 shows an example flowchart 500 illustrating a method for blocking malicious traffic in containerized environments based on learned domain names according to an embodiment. In an embodiment, the method is performed by the detector container 315, FIG. 3.

At S510, during a learning phase, traffic from an APP container is intercepted and inspected to create a DNS policy for the APP container. The traffic includes DNS queries. Based on the intercepted traffic, a DNS policy is created. The DNS policy defines a whitelist of allowed domain names for the APP container. The DNS policy may further define previously resolved domain names, normal behavior of the APP container, or both. In an embodiment, the learning phase is conducted over a predetermined period of time after execution of the APP container begins.

In some implementations, S510 may further include identifying the deployment of an APP container and analyzing the contents of the APP container to determine a type of the APP container, a type of an app executed via the APP container, or both. To this end, S510 may also include receiving an indication of the addition or change of an APP container and extracting the contents of the APP container.

In an embodiment, the whitelisted domain names may be or may include domain names associated with known addresses in a network through which the APP container communicates. To this end, the method of FIG. 5 may further include learning the known addresses in the network based on, but not limited to, a cluster configuration for a cluster of host devices including the host device executing the APP container, one or more DNS rules applied to the software container (e.g., a rule that the container should only resolve DNS queries to other services in the same cluster), and the like. The learning of known addresses in the network may be performed offline, i.e., prior to runtime of the software container.

In an embodiment, DNS integrity may be ensured by comparing whitelist results among a cluster. To this end, S510 may further include comparing the learned whitelisted domain names and associated known addresses for the software container to results of learning whitelisted domain names and associated known addresses for other software containers in the same cluster. If any results do not match (e.g., the same domain name is associated with different addresses for different software containers), a DNS spoofing attempt may be detected.

At S520, during a detection phase, traffic from the APP container is monitored with respect to the DNS policy. Monitoring the traffic may include, but is not limited to, intercepting and inspecting requests. More specifically, domain names included in DNS queries among the monitored traffic may be compared to the whitelist for the APP container in order to determine whether the domain name is a recognized domain name for the APP container. Further, domain names of pending DNS queries may be compared to the previously resolved domain names. Moreover, parameters related to behavior of the software container with respect to DNS queries may be compared to the learned normal behavior of the software container.

In an embodiment, each of S510 and S520 includes inspecting the intercepted traffic to identify malicious traffic. The identification is performed based on the DNS policy of the protected APP container. It should be noted that, in some implementations, the monitored traffic may include DNS queries sent over an encrypted connection (e.g., DNS over Transport Layer Security). To this end, each of S510 and S520 may further include interfacing with the protected APP container and a server's operating system at runtime to securely retrieve keys from the protected APP container. Using the retrieved keys, the detector can terminate the encrypted connection and decrypt the traffic for inspection.

In some implementations, encrypted traffic may be intercepted via a serverless defender utilized via loader code injected into a serverless application (e.g., injected into code of the APP container executing the application). An example technique for intercepting traffic at the application level is described further in U.S. patent application Ser. No. 16/144,347, assigned to the common assignee, the contents of which are hereby incorporated by reference. This is performed without deploying additional certificates. In another implementation, encrypted traffic may be intercepted using man-in-the-middle techniques and injecting out a trusted certificate. To this end, in such an implementation, the trusted root certificates are injected into the protected APP container.

At S530, it is determined whether any of the monitored traffic is malicious and, if so, execution continues with S540; otherwise, execution continues with S520. In an embodiment, it is determined that monitored traffic is malicious when a domain name indicated in a DNS query does not match any of the domain names in the whitelist.

At S540, when it is determined that at least a portion of the monitored traffic is malicious, a botnet is detected. Specifically, a botnet implemented using a bot executed in the monitored software container is detected.

At S550, when a botnet is detected, one or more mitigation actions are performed and execution continues with S520. The mitigation actions may include, but are not limited to, blocking at least a portion of traffic from the APP container. Specifically, communications between the APP container and the entity having the requested domain name are blocked, for example, by blocking the malicious DNS queries. Accordingly, bot activity such as requesting commands from a command and control server may be mitigated. In an embodiment, S540 may further include generating a notification or alert indicating that a botnet has been detected with respect to the APP container.

At optional S560, it may be determined whether a DNS spoofing attempt has been detected and, if so, additional mitigation actions may be performed. To this end, when one or more DNS queries are resolved (i.e., the DNS queries are not blocked as part of the mitigation actions at S550), DNS spoofing attacks may be detected based on IP addresses of the resolved DNS queries. In an embodiment, S560 includes determining whether any of the IP addresses resulting from the resolved DNS queries are inapplicable to the APP container.

An IP address may be inapplicable to the APP container when the IP address is not among previous IP address results in the DNS policy for the APP container and the IP address is associated with an unknown entity. As a non-limiting example, a query for "www.ABCcorp.com" may return one or more known IP addresses matching previously resolved IP addresses listed in the DNS policy and one new IP address that does not match any previously resolved IP addresses listed in the DNS policy. It is determined whether the IP address is associated with an unknown entity by checking a network signature for the IP address via a site associated with the IP address and comparing the network signature to the signatures of known entities defined in the DNS policy for the APP container.

It should be noted that FIG. 5 is described with respect to detecting botnets with respect to a single APP container merely for simplicity purposes and without limitation on the disclosed embodiments. DNS policies for multiple APP containers may be created and utilized to detect botnets in a containerized environment without departing from the scope of the disclosure.

It should be noted that various embodiments have been discussed herein with a reference to software containers. A software container provides an executable environment with a complete filesystem. A software container may include, but is not limited to, a micro-service, a Docker container, a light virtual machine, and the like.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for runtime detection of botnets in containerized environments, comprising:
   creating a domain name system (DNS) policy for a software container, wherein the DNS policy defines at least a plurality of allowed domain names that are allowed to be accessed by the software container, wherein the DNS policy is created based on historical DNS queries by the software container, wherein the software container is executed in a first node, wherein a cluster of nodes includes the first node and at least one second node;
   checking DNS integrity by comparing the plurality of allowed domain names to at least one other plurality of allowed domain names of software containers executed in the at least one second node;
   detecting a botnet based on traffic to and from the software container, wherein the botnet is detected when at least a portion of the traffic does not comply with the DNS policy, wherein the botnet is implemented via communication with a bot executed in the software container; and
   blocking at least one DNS query in the at least a portion of traffic, wherein each blocked DNS query is to a domain having a domain name that does not match any of the plurality of allowed domain names for the software container.

2. The method of claim 1, wherein each of the plurality of allowed domain names is associated with a known address in a network through which the software container communicates.

3. The method of claim 1, wherein the at least a portion of the traffic does not comply with the DNS policy when the at least one DNS query in the at least a portion of traffic is directed to a domain name that has not been resolved by the historical DNS queries by the software container.

4. The method of claim 1, wherein the plurality of allowed domain names is a plurality of first domain names, wherein the at least one blocked DNS query includes all DNS queries in the traffic to and from the software container when the traffic includes a plurality of DNS queries directed to a plurality of second domain names that do not match any of the plurality of first domain names.

5. The method of claim 1, wherein the traffic to and from the software container is encrypted traffic, further comprising:
   retrieving keys from the software container;
   intercepting the encrypted traffic; and
   decrypting the encrypted traffic using the retrieved keys, wherein the botnet is detected based on the decrypted traffic.

6. The method of claim 5, wherein the traffic is decrypted without deploying additional certificates, wherein the encrypted traffic is intercepted using a serverless defender executed in the software container, wherein the serverless defender is deployed in the software container via loader code injected into code of the software container.

7. The method of claim 1, wherein the traffic to and from the software container is encrypted traffic, further comprising:
   injecting a trusted certificate into the software container;
   intercepting the encrypted traffic; and
   decrypting the encrypted traffic using the trusted certificate.

8. The method of claim 1, wherein the software container is a first software container executed in a host, wherein the method is performed by a detector container, wherein the detector container is a second software container executed in the host.

9. A non-transitory computer readable medium having stored thereon instructions for causing a processing circuitry to execute a process, the process comprising:
   creating a domain name system (DNS) policy for a software container, wherein the DNS policy defines at least a plurality of allowed domain names that are allowed to be accessed by the software container, wherein the DNS policy is created based on historical DNS queries by the software container, wherein the software container is executed in a first node, wherein a cluster of nodes includes the first node and at least one second node;
   checking DNS integrity by comparing the plurality of allowed domain names to at least one other plurality of allowed domain names of software containers executed in the at least one second node;
   detecting a botnet based on traffic to and from the software container, wherein the botnet is detected when at least a portion of the traffic does not comply with the DNS policy, wherein the botnet is implemented via communication with a bot executed in the software container; and
   blocking at least one DNS query in the at least a portion of traffic, wherein each blocked DNS query is to a domain having a domain name that does not match any of the plurality of allowed domain names for the software container.

10. A system for runtime detection of botnets in containerized environments, comprising:
    a processing circuitry; and
    a memory, the memory containing instructions that, when executed by the processing circuitry, configure the system to:
    create a domain name system (DNS) policy for a software container executed in the system, wherein the DNS policy defines at least a plurality of allowed domain names that are allowed to be accessed by the software container, wherein the DNS policy is created based on historical DNS queries by the software container, wherein the software container is executed in a first node, wherein a cluster of nodes includes the first node and at least one second node;
    check DNS integrity by comparing the plurality of allowed domain names to at least one other plurality of allowed domain names of software containers executed in the at least one second node;
    detect a botnet based on traffic to and from the software container, wherein the botnet is detected when at least a portion of the traffic does not comply with the DNS policy, wherein the botnet is implemented via communication with a bot executed in the software container; and
    block at least one DNS query in the at least a portion of traffic, wherein each blocked DNS query is to a domain having a domain name that does not match any of the plurality of allowed domain names for the software container.

11. The system of claim 10, wherein each of the plurality of allowed domain names is associated with a known address in a network through which the software container communicates.

12. The system of claim 10, wherein the at least a portion of the traffic does not comply with the DNS policy when the at least one DNS query in the at least a portion of traffic is directed to a domain name that has not been resolved by the historical DNS queries by the software container.

13. The system of claim 10, wherein the plurality of allowed domain names is a plurality of first domain names, wherein the at least one blocked DNS query includes all DNS queries in the traffic to and from the software container when the traffic includes a plurality of DNS queries directed to a plurality of second domain names that do not match any of the plurality of first domain names.

14. The system of claim 10, wherein the traffic to and from the software container is encrypted traffic, wherein the system is further configured to:

retrieve keys from the software container;

intercept the encrypted traffic; and decrypt the encrypted traffic using the retrieved keys, wherein the botnet is detected based on the decrypted traffic.

15. The system of claim 14, wherein the traffic is decrypted without deploying additional certificates, wherein the encrypted traffic is intercepted using a serverless defender executed in the software container, wherein the serverless defender is deployed in the software container via loader code injected into code of the software container.

16. The system of claim 10, wherein the traffic to and from the software container is encrypted traffic, wherein the system is further configured to:

inject a trusted certificate into the software container;

intercept the encrypted traffic; and decrypt the encrypted traffic using the trusted certificate.

17. The system of claim 10, wherein the software container is a first software container, wherein a detector container is also executed in the system, wherein the detector container is a second software container configured to at least create the DNS policy, detect the botnet, and block the at least one DNS query.

* * * * *